United States Patent
Jindai et al.

(10) Patent No.: US 8,003,939 B2
(45) Date of Patent: Aug. 23, 2011

(54) FOREIGN MATTER OR ABNORMAL UNSMOOTHNESS INSPECTION APPARATUS AND FOREIGN MATTER OR ABNORMAL UNSMOOTHNESS INSPECTION METHOD

(75) Inventors: Kazuhiro Jindai, Yokohama (JP); Hideto Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/606,256

(22) Filed: Oct. 27, 2009

(65) Prior Publication Data
US 2010/0038531 A1 Feb. 18, 2010

Related U.S. Application Data

(62) Division of application No. 12/036,746, filed on Feb. 25, 2008, now Pat. No. 7,629,577.

(30) Foreign Application Priority Data

Mar. 1, 2007 (JP) .................................. 2007-051586

(51) Int. Cl.
*G01L 1/04* (2006.01)
(52) U.S. Cl. ................. 250/309; 73/1.01; 73/81; 73/83; 73/105; 428/408; 204/192.15
(58) Field of Classification Search .................. 250/281, 250/282, 309; 73/1.01, 81, 83, 105; 428/408; 204/192.15
See application file for complete search history.

(56) References Cited

U.S. PATENT DOCUMENTS

| 5,470,661 | A | 11/1995 | Bailey et al. | 428/408 |
| 5,618,389 | A | 4/1997 | Kreider | 204/192.15 |
| 6,053,034 | A | 4/2000 | Tsui et al. | 73/81 |
| 6,817,255 | B2 | 11/2004 | Haque et al. | 73/862.638 |
| 6,883,367 | B2 | 4/2005 | Feng et al. | 73/81 |
| 7,107,694 | B2 | 9/2006 | Yang et al. | 33/18.1 |
| 7,348,571 | B2 | 3/2008 | Ue | 250/442.11 |
| 7,451,636 | B2 | 11/2008 | Bradshaw et al. | 73/83 |
| 7,629,577 | B2 * | 12/2009 | Jindai et al. | 250/309 |

FOREIGN PATENT DOCUMENTS

| JP | 60-218845 | 11/1985 |
| JP | 11-23481 | 1/1999 |
| JP | 2004-107192 | 4/2004 |

* cited by examiner

*Primary Examiner* — David A Vanore
(74) *Attorney, Agent, or Firm* — Fitzpatrick, Cella, Harper & Scinto

(57) ABSTRACT

A foreign matter detecting apparatus includes a detecting device for detecting foreign matter by measuring smoothness of a surface of an object undergoing measurement, a marking device for providing a dent on the surface of the object with a predetermined horizontal distance from the foreign matter detected by the detecting device, and a mass spectrum measuring device for irradiating and scanning a small area with a primary ion beam, as a part of the object, including the foreign matter and the dent, so as to measure a mass spectrum of secondary ions emitted from the foreign matter located at a position within a predetermined horizontal distance from the dent.

16 Claims, 3 Drawing Sheets

FOREIGN MATTER AND TEST OBJECT

TEST OBJECT

FOREIGN MATTER

FOREIGN MATTER OR ABNORMAL UNSMOOTHNESS INSPECTION APPARATUS AND FOREIGN MATTER OR ABNORMAL UNSMOOTHNESS INSPECTION METHOD

This is a divisional application of copending U.S. patent application Ser. No. 12/036,746, filed on Feb. 25, 2008, now U.S. Pat. No. 7,629,577.

This application also claims priority from Japanese Patent Application No. 2007-051586, filed Mar. 1, 2007, which is hereby incorporated by reference herein.

FIELD OF THE INVENTION AND RELATED ART

The present invention relates to a foreign matter or an abnormal unsmoothness inspection apparatus for identifying a position of foreign matter deposited on, or abnormal unsmoothness at, a surface of a wafer, a glass substrate, or the like, and for analyzing a composition of the foreign matter or abnormal unsmoothness, particularly, a foreign matter or an abnormal unsmoothness inspection apparatus capable of detecting foreign matter or abnormal unsmoothness on the order of 1 µm or less. The present invention also relates to a foreign matter or an abnormal unsmoothness inspection method using the foreign matter or the abnormal unsmoothness inspection apparatus.

In a case wherein minute dust deposited on a surface of a substrate, such as a wafer, or the like, or a defect of minute wiring on the substrate is detected, Japanese Laid-Open Patent Application (JP-A) Sho 60-218845 discloses an inspection apparatus for analyzing foreign matter or abnormal unsmoothness through a scanning microscope, on the basis of positional information obtained by detecting the foreign matter or abnormal unsmoothness, together with coordinate information through an optical means using a phototransmitter/photoreceptor.

A laser beam of the optical means used for detecting the foreign matter or abnormal unsmoothness has a spot diameter of several tens of micrometers, whereas the scanning microscope has a spot diameter of, as small as, about 01.0 µm, so that it takes a long time to aim a scanning beam at the foreign matter or abnormal unsmoothness. Further, in order to take sight of an analyzer, or the like, at a minute object on a measuring (test) object, it is necessary to ensure positional reproducibility with the same accuracy as that of a size of the minute object, with respect to an XY stage for mounting the measuring object thereon. Therefore, it takes time to move the XY stage, so that it takes a long time to detect a substrate of, e.g., 200 nm×300 nm. For this reason, e.g., JP-A-Hei 11-23481 describes an apparatus capable of automatically adjusting, by a feedback control apparatus, a detection position and an observation position of a scanning electron microscope (SEM), or the like, through detection of a minute object on a sample with scattered light of a spot diameter-adjusted laser beam.

In such a minute object analyzer, an efficiency of observation and analysis of the minute object is improved. However, generally, an optical detecting means, such as a laser beam, or the like, has a diffraction limit in a wavelength range (region), so that a substantially detectable size of the minute object is about 1 µm. It is difficult to ensure a spatial resolution of submicrons, even when coherent light, or the like, is utilized. Further, accuracy of alignment of the detection position of the minute object with the observation (or analysis) position of the minute object depends on a mechanical mechanism. For this reason, accuracy on the order of submicrons is less expected, so that it is difficult to identify a position of the minute object of 1 µm or less. The positional identification of the minute object of 1 µm or less by the SEM, or the like, is easy, but it is also necessary to effect electroconductive treatment on a surface of a sample when the sample is an organic sample, which is easily charged electrically. This makes it difficult to utilize a time-of-flight secondary ion mass spectrometer (TOF-SIMS), which is useful for analysis of the organic minute object. Further, with respect to the minute object of 1 µm or less, an intermolecular force is dominant, so that a collecting operation is very difficult. Even if the minute object can be collected, it is further difficult to fix the minute object at a desired position.

Incidentally, a nanoindenter used for fine processing has a triangular-pyramid-like indenter, and is capable of processing with a depth of several nanometers by loading an object with the indenter. JP-A 2004-107192 describes a method in which a catalyst is formed at a dent of several nanometers on a substrate by using the nanoindenter of this type and, at the dent, a carbon nanotube is grown at the dent.

SUMMARY OF THE INVENTION

A principal object of the present invention is to provide a foreign matter or an abnormal unsmoothness inspection apparatus and a foreign or an abnormal unsmoothness inspection method, which are capable of reliably detecting foreign matter or abnormal unsmoothness, on the order of submicrons, on a substrate-like measuring object, together with its positional information, and efficiently performing analysis with reliability, without specifying and analyzing after collecting the foreign matter or abnormal unsmoothness from the measuring object. Particularly, an object of the present invention is to provide a foreign matter or an abnormal unsmoothness inspection method, which are capable of performing detection and analysis of minute organic foreign matter or abnormal unsmoothness.

The present inventors have found that it is possible to analyze the foreign matter or abnormal unsmoothness in such a manner that the foreign matter or abnormal unsmoothness on the surface of the measuring object is detected by measuring a degree of smoothness (or irregularity) of the surface of the measuring object, such as a substrate, and a dent is formed at a predetermined (specific) position distant from the foreign matter or abnormal unsmoothness and, thereafter, a mass spectrum is obtained at a predetermined position distant from the dent by a mass spectrum measuring means. Based on such findings, the present inventors have accomplished a foreign matter or an abnormal unsmoothness inspection apparatus, according to the present invention, capable of analyzing the foreign matter or abnormal unsmoothness, on the order of submicrons, in a short time.

According to one aspect, the present invention provides a foreign matter or an abnormal unsmoothness inspection apparatus comprising:

detecting means for detecting foreign matter or abnormal unsmoothness, by measuring smoothness of a surface of a substrate-like measuring object;

marking means for providing a dent on the surface of the measuring object with a predetermined horizontal distance from the foreign matter or abnormal unsmoothness; and mass spectrum measuring means for measuring a mass spectrum of secondary ions emitted from a position with a predetermined horizontal distance from the dent, by detecting the dent through impact, and scanning the surface of the measuring object with a primary ion beam.

According to another aspect, the present invention provides a foreign matter or an abnormal unsmoothness inspection method comprising:

a detecting step of detecting foreign matter or abnormal unsmoothness by measuring smoothness of a surface of a substrate-like measuring object;

a marking step of providing a dent on the surface of the measuring object with a predetermined horizontal distance from the foreign matter or abnormal unsmoothness; and a mass spectrum measuring step of measuring a mass spectrum of secondary ions emitted from a position with a predetermined horizontal distance from a dent by detecting the dent through impact, and scanning the surface of the measuring object with a primary ion beam.

The foreign matter or abnormal unsmoothness inspection apparatus and foreign matter or abnormal unsmoothness inspection method according to the present invention are capable of reliably detecting foreign matter or abnormal unsmoothness on the order of submicrons on a substrate-like measuring object, together with its positional information, and efficiently performing analysis with reliability, without specifying and analyzing, after collecting the foreign matter or abnormal smoothness from the measuring object. Particularly, the foreign matter or abnormal unsmoothness inspection apparatus and foreign matter or abnormal unsmoothness inspection method of the present invention are capable of performing detection and analysis of minute organic foreign matter or abnormal unsmoothness, with reliability.

These and other objects, features and advantages of the present invention will become more apparent upon a consideration of the following description of the preferred embodiments of the present invention, taken in conjunction with the accompanying drawings.

DETAILED DESCRIPTION OF THE PREFERRED EMBODIMENTS

Figure 1:
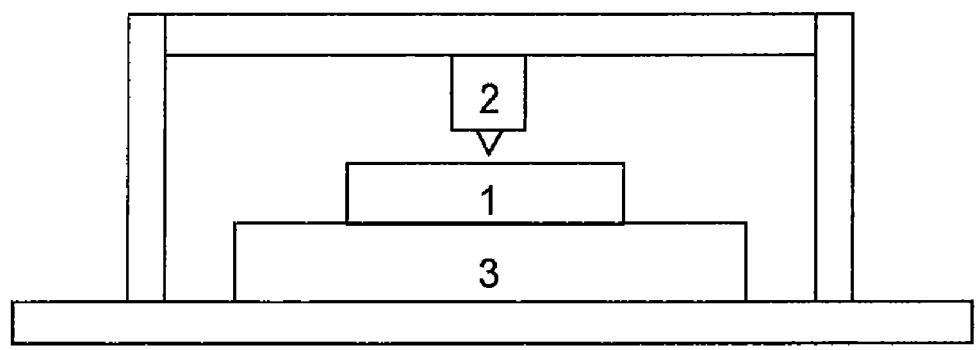
FIG. 1 is a schematic view showing an embodiment of a marking means of the foreign matter or abnormal unsmoothness inspection apparatus according to the present invention.

A measuring object as an object to be inspected in the foreign matter or abnormal unsmoothness inspection apparatus according to the present invention is a substrate-like member of an inorganic material or an organic material, and has a macroscopic flat surface. More specifically, the measuring object may including a semiconductor wafer, a glass substrate, and the like. Foreign matter or abnormal unsmoothness on the measuring object surface may be any of an inorganic material and an organic material. The foreign matter or abnormal unsmoothness as the object to be inspected may be, not only a material different from the measuring object, but also, a material that is identical to the material for the measuring object, and has a projection larger than a degree of smoothness of the surface of the measuring object. A size of the foreign matter or abnormal unsmoothness may be of any size, as long as the size exceeds the degree of smoothness of the surface itself. If the foreign matter or abnormal unsmoothness has a spherical or semi-spherical shape, it is possible to cover a foreign matter or abnormal unsmoothness with a submicron diameter of less than 1 μm. In the following, the term "foreign matter or abnormal unsmoothness" is inclusively referred to simply as "foreign matter".

As the detecting means for detecting the foreign matter used in the foreign matter inspection apparatus of the present invention, it is possible to use means capable of measuring the (degree of) surface smoothness of the substrate-like smoothness. Specifically, a scanning electron microscope (SEM), a reflection electron microscope, an ion microscope, an automatic force microscope (AFM), an electrical force microscope (EFM), a magnetic force microscope (MFM), and the like, are applicable. The scanning electron microscope (SEM) irradiates the measuring object with an electron beam and detects a secondary electron, a reflection electron, a transmission electron, X-rays, fluorescence, an internal electromotive force, or the like, emitted from the measuring object. The ion microscope obtains an image of the measuring object surface by using an ion, such as protons, helium ions, or lithium ions, instead of electrons in the electron microscope. The atomic force microscope (AFM) is a type of scanning electron microscope, and obtains an image of the surface smoothness (irregularity) of the measuring object by measuring an atomic force exerted between a cantilever (probe) and the measuring object from a vertical direction of the probe. In a case in which the measuring object is formed of an inorganic material, although the scanning electron microscope, or the like, may also be used, the atomic force microscope utilizing the atomic force is particularly preferred, since it permits measurement in the air, a small apparatus size, and measurement without performing electroconductive coating, even when the measuring object is formed of an insulating material. Such an atomic force microscope may include those performing detection of the surface in a contact mode, a non-contact mode, a tapping mode, and the like.

In a contact mode microscope, a probe is provided on a stage, having a cylindrical shape, or the like, for mounting thereon the measuring object, and a flat plate-like portion at a probe tip is irradiated with laser light. Reflected laser light is measured at a center of a quadrant (four-element) or dual (two-element) photodiode. When the probe is brought near to the measuring object surface, the probe is attracted to the measuring object surface, so that the probe is deformed and contacts the measuring object surface. Due to this deformation, an angle of the reflected light is changed, so that a difference in photoelectromotive force between divided areas of the photodiode is caused to occur. The probe or the stage is vertically moved in a z-axis direction, so as to keep the difference in photoelectromotive force at a constant value (i.e., to keep a displacement of the probe at a constant value) by using a feedback circuit, while being moved in XY directions, thus, performing scanning of the entire surface of the measuring object. Based on control signals for movement in XYZ directions, an image of the measuring object surface is obtained.

In a non-contact mode atomic force microscope, the probe is positioned in the neighborhood of the measuring object surface with a distance of several nanometers from the measuring object surface, while being oscillated vertically by a piezoelectric element, and an atomic force between the measuring object and the probe is measured. Scanning the entire surface of the measuring object is performed by vertically moving the probe or the stage in the z-axis direction, while moving the probe or the stage in the XY directions, so as to keep the atomic force at a constant level by using the feedback circuit. Based on control signals for movement in the XYZ directions, an image of the measuring object surface is obtained. The non-contact mode atomic force microscope effects detection in a non-contact stage and, therefore, breakage of the measuring object by the probe can be prevented, thus being particularly suitable as the foreign matter detecting means used in the present invention.

In a tapping mode atomic force microscope, the probe is vertically moved at the measuring object surface in a jumping manner to measure smoothness of the surface. This atomic force microscope has a high resolving power and is capable of performing accurate measurement, measurement in a liquid, and measurement of a breakable measuring object.

As the marking means used for the foreign matter inspection method of the present invention, any means, which recognizes a horizontal distance from the foreign matter and provides a dent at the measuring object surface, can be used, but it is preferable that a nanoindenter is used. The nanoindenter has a probe (indenter) having a tip diameter of 0.1-1 μm. This probe or the measuring object is moved in a vertical direction, so that the measuring object is loaded with the probe into a depth of several tens of nanometers to several microns. Thereafter, the loading is removed, and a dent is provided to the surface of the measuring object that is to be subjected to measurement of Young's modulus. The nanoindenter includes the probe to be indented, an indenter drive portion for driving the probe in the vertical direction, a displacement measuring portion for measuring a displacement of the probe in the vertical direction, a load measuring portion for measuring a load between the probe and the measuring object, a positioning portion for positioning a (mounting) stage for mounting thereon the measuring object, and the like. As the probe, it is preferable that a material having a hardness higher than that of the measuring object surface is used. For example, a diamond probe applicable to measuring objects of any type of material may preferably be used.

In such a nanoindenter, when foreign matter on the measuring object surface is detected, together with positional information about the foreign matter on the stage, such as an XY stage, or the like, the stage is horizontally moved, so that the probe is located above a predetermined (specific) position of the measuring object. A predetermined position at which the probe is located may preferably be such a position that the probe is included together with the foreign matter, within a scanning range of a primary ion beam used for a mass spectrum measuring means (to be described later). Specifically, the predetermined position of the probe may be a position above a position within the scanning range of the primary ion beam used for the mass spectrum measuring means, or a position above a peripheral edge portion, or the like, outside a foreign matter detection area of the measuring object. A horizontal movement distance of the stage at this time is recognized, so that a horizontal distance between the probe and the foreign matter is recognized and stored. The probe or the stage for the measuring object is moved in the vertical direction, so that the probe tip is pressed into the measuring object surface so as to form the dent at the measuring object surface. As a shape of the dent formed on the measuring object, the probe tip may have various shapes, such as a triangular shape, a quadrangular pyramid shape, a conical shape, and the like, so that the dent is formed in a shape corresponding to the top shape of the probe. For example, in the case in which the probe tip has the conical shape, the dent may have a diameter of 1-10 μm and a depth of 1-5 μm. A size and the shape of the dent formed on the measuring object are not particularly limited, as long as the dent is recognizable by a time-of-flight secondary ion mass spectrometer (to be described later). The horizontal distance between the dent on the measuring object and the foreign matter corresponds to the horizontal distance between the probe and the foreign matter.

Figure 4:
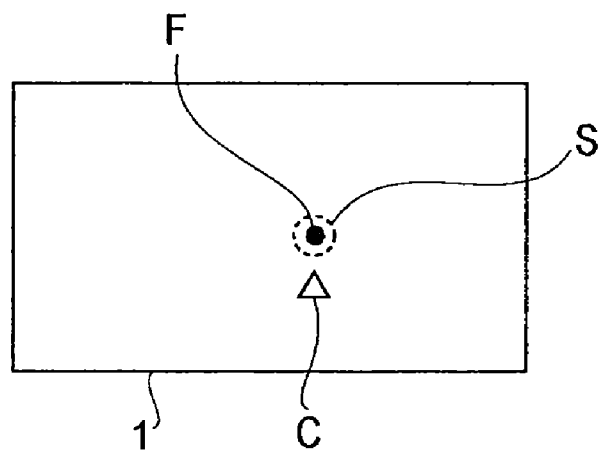
FIG. 4 is a schematic view for illustrating a method of obtaining a mass spectrum of foreign matter or abnormal unsmoothness in the foreign matter or abnormal unsmoothness inspection apparatus of the present invention.

As an example of the above-described nanoindenter, a nanoindenter shown in FIG. 1 may be employed. The nanoindenter shown in FIG. 1 includes an XYZ stage 3 for mounting thereon a measuring object 1 and a nanoindent probe 2. The XYZ stage for mounting the measuring object is moved in XY directions, so that a position for forming a dent (C shown in FIG. 4) on the measuring object is located immediately under the nanoindent probe. An amount of movement at this time of the XYZ stage in the XY directions is recognized, and a horizontal distance from foreign matter (F shown in FIG. 4), detected by a detecting means, is stored. Further, the XYZ stage is raised in a Z direction, until the nanoindent probe tip reaches a predetermined depth position from the measuring object surface to form the dent at the measuring object surface.

The mass spectrum measuring means used in a foreign matter inspection apparatus of the present invention impacts and scans the measuring object surface with a primary ion beam, to obtain a mass spectrum of secondary ions emitted from the foreign matter on the measuring object. The mass spectrum measuring means can detect a portion having a different electrical field distribution as the dent, since secondary ions emitted from the dent are diffused at a detecting portion for detecting secondary ions emitted from the measuring object and, therefore, an amount of ions collected by the detecting portion is largely lowered. From the position of the detected dent, a position of the foreign matter located with the recognized and stored horizontal distance from the dent is obtained and, by using a mass spectrum of secondary ions obtained from the position, it is possible to efficiently perform identification and analysis of the foreign matter.

In such a mass spectrum measuring means, in a case in which the foreign matter to be detected is assumed to be spherical or semi-spherical, a spot diameter of the primary ion beam may preferably be smaller than a diameter of the foreign matter, since extraction of information as the mass spectrum desired from the foreign matter is easy. In the case wherein the spot diameter of the primary ion beam is larger than the diameter of the foreign matter, it is possible to extract a mass spectrum obtained by differential analysis between a mass spectrum from a peripheral portion containing no foreign matter and a mass spectrum from the foreign matter position. The spot diameter of the primary ion beam may be, e.g., 0.1-1 μm. It is preferable that a type of metal used for such a primary ion beam is any of gold, bismuth, gallium, indium, and germanium, since an ion source using these metals is commercially available as a liquid metal ion gun (LMIG) capable of easily decreasing the spot diameter of the primary ion beam.

The above-described mass spectrum measuring means may preferably be provided with a data processing mechanism for performing identification of the foreign matter from the mass spectrum. Examples of the data processing mechanism may include apparatuses for performing peak analysis of the mass spectrum, comparison processing with a reference sample, arithmetic processings, or the like, such as differential-integral processing of peaks, function processing of peaks, and the like.

Examples of the mass spectrum measuring means may specifically include a magnetic field mass spectrometer, a quadruple secondary ion mass spectrometer, a time-of-flight secondary ion means spectrometer (TOF-SIMS), etc. A measuring mode may be either of a dynamic mode, in which the measuring object is measured destructively while being cut, and a static mode, in which the measuring object is measured nondestructively, but the static mode effecting the nondestructive measurement is preferred. In a case in which the scanning microscope as the foreign matter detecting means, the scanning microscope is also applicable to the mass spectrum measuring means. As the mass spectrum measuring means, the time-of-flight secondary ion mass spectrometer as a type of the static mode mass spectrum measuring means is preferred.

Figure 2:
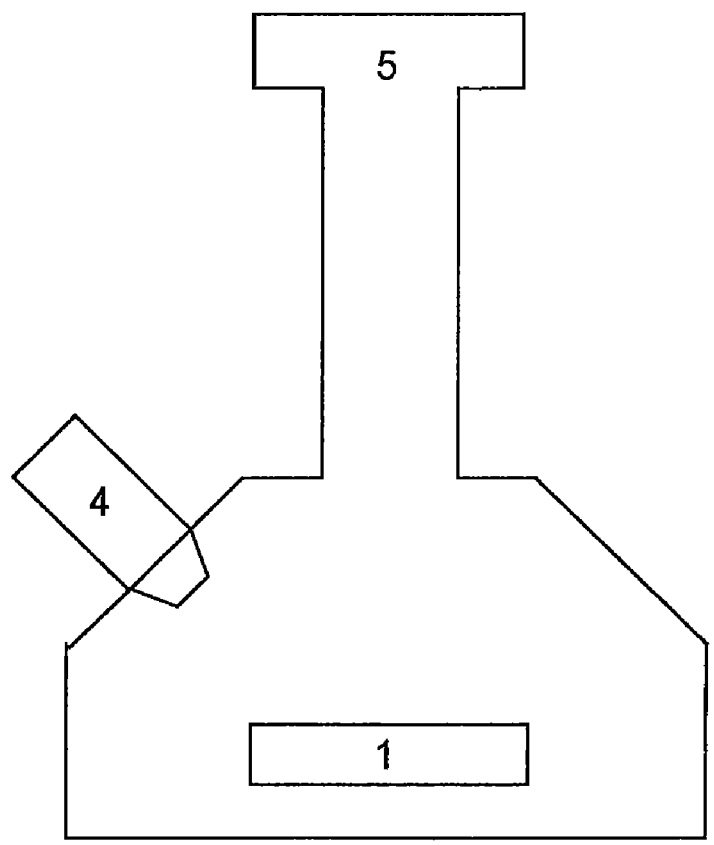
FIG. 2 is a schematic view showing an embodiment of a mass spectrum measuring means of the foreign matter or abnormal unsmoothness inspection apparatus of the present invention.

As an example of the time-of-flight secondary ion mass spectrometer, it is possible to use a time-of-flight secondary ion mass spectrometer, shown in FIG. 2. The time-of-flight secondary ion mass spectrometer shown in FIG. 2 includes an ion gun 4 for impacting a measuring object 1 with primary ions, and a detector 5 for detecting a time of flight of secondary ions emitted from the surface of the measuring object by the primary ion impact. In addition, the time-of-flight secondary ion mass spectrometer includes a scanning apparatus for scanning the measuring object surface with the primary ions, a leading electrode for accelerating the secondary ions emitted from the measuring object surface, and the like (not shown). The ion gun emits ions of gold, bismuth, gallium, indium, germanium, or the like, as an ion beam-like pulse. The spot diameter of the ion beam is adjusted so as to be smaller than an estimated diameter of the foreign matter and the ion beam successively scans and impacts the measuring object surface with the ion beam in XY directions. The measuring object surface is bombarded with the ions emitted from the ion gun to break molecules, so that fragments and ionized molecules are emitted as secondary ions. A flying speed of the secondary ions collected by the detector depends on the mass of the ions, so that the mass spectrum of the secondary ions is obtained from a time until the secondary ions reach the detector, to identify the molecules or the molecule fragments. An energy distribution of the secondary ions lowers mass resolving power, so that it is also possible to improve the mass resolving power, by converging the ions at an electrostatic field, in order to decrease energy aberration.

Figure 3:
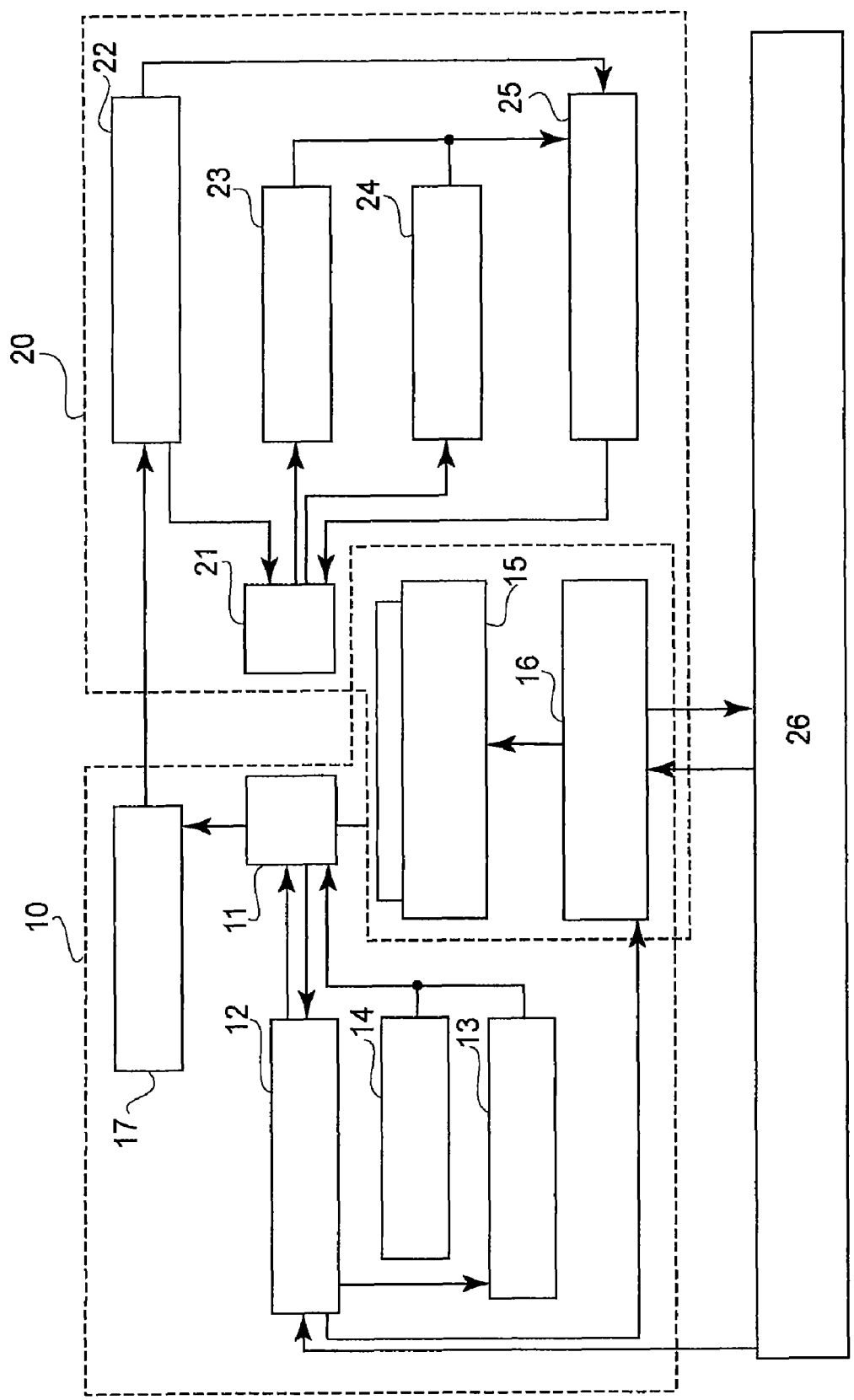
FIG. 3 is a schematic diagram showing an embodiment of the foreign matter or abnormal unsmoothness inspection apparatus of the present invention.

As an embodiment of the foreign matter inspection apparatus described above, it is possible to employ a foreign matter inspection apparatus shown in a constitutional diagram of FIG. 3. The foreign matter inspection apparatus shown in FIG. 3 includes an atomic force microscope (AFM) 10 as a detecting means, a nanoindenter 20 as a marking means, and a time-of-flight secondary ion mass spectrometer (not shown). The atomic force microscope 10 includes a cantilever 11, a frequency measuring portion 12, a feedback circuit 13, a piezoelectric element 14, an ultrasonic XYZ stage 15, an XYZ stage positioning portion 16, a foreign matter detecting portion 17, and the like. The nanoindenter 20 includes a probe 21, an indenter driving portion 22, a load measuring portion 23, a displacement measuring portion 24, a feedback circuit 25, in which the ultrasonic XYZ stage 15 is common to the atomic force microscope 10, the XYZ stage positioning portion 16 common to the atomic force microscope 10, and the like.

The cantilever 11 in the atomic force microscope 10 is disposed so that a tip thereof is positioned in the neighborhood of the surface of the measuring object 1 with a distance of about several nanometers therebetween. The frequency measuring portion 12 is controlled by a CPU 26, and measures an amplitude, a phase, and a frequency of oscillation of the cantilever 11, fluctuating depending on a distance between the cantilever 11 and the measuring object 1. The feedback circuit 13 drives (actuates) a vertical movement mechanism (not shown) to fluctuate the position of the cantilever 11, so that the fluctuation of the frequency, and the like, measured by the frequency measuring portion 12, is cancelled, to provide a measured value with a constant frequency, i.e., so that the distance between the cantilever 11 and the measuring object 1 is kept at a constant level. The ultrasonic XYZ stage 15 includes an XYZ stage moved in XYZ directions, with high accuracy, by an ultrasonic linear motor controlled by the XYZ stage positioning portion 16, controlled by the CPU 26.

The foreign matter detecting portion 17 detects a larger projection, as foreign matter, compared with projections and dents at the measuring object surface.

The indenter driving portion 22 in the nanoindenter 20 moves the ultrasonic XYZ stage 15 in the XY directions through the XYZ stage position portion 16, when a foreign matter detection signal from the foreign matter detecting portion 17, which detected the foreign matter on the measuring object, is inputted. By the movement of the ultrasonic XYZ stage in the XY directions, the probe 21 is located at a predetermined position. An amount of movement at this time of the ultrasonic XYZ stage in the horizontal direction is recognized and stored in the CPU 26. Thereafter, the vertical movement mechanism (not shown) for the probe 21 is driven, so that a tip of the probe is pressed into the measuring object surface, until it reaches a predetermined position. At this time, an amount of load and an amount of displacement are measured by the load measuring portion 23 and the displacement measuring portion 24, respectively, and from measured values, an amount of movement of the probe 21 is adjusted by the feedback circuit 26 to form a dent.

A nanoindenter apparatus having a function of the atomic force microscope is also commercially available, so that it is also possible to effect the detection of the foreign matter and the dent formation by the same control mechanism. Further, the XYZ stage is also not limited to one using the ultrasonic linear motor, but may also be one including a stage having a control mechanism by an encoder, and a stage having a control mechanism by a piezoelectric element in combination. By the stage control through the piezoelectric element, it is possible to effect the foreign matter detection and the dent formation with high accuracy.

As the time-of-flight secondary ion mass spectrometer (TOF-SIMS), one similar to that shown in FIG. 2 can be employed. The measuring object on which the dent is formed by the nanoindenter is set in the TOF-SIMS, and is impacted and scanned at its surface with primary ions from the ion gun. In the detector, a portion different in electrical field from other portions is detected as the dent. A mass spectrum of the foreign matter is obtained by collecting secondary ions from a position with a predetermined horizontal distance from the dent by the detector. In the case in which the spot diameter of the primary ions is larger than a diameter of the foreign matter, the mass spectrum of the foreign matter can be specifically obtained in the following manner.

Figure 5A:
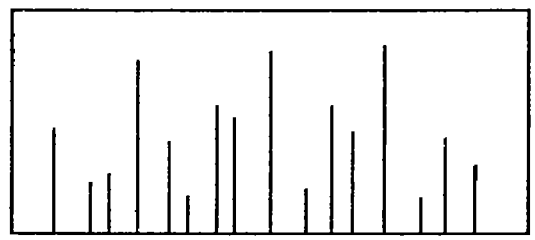
FIGS. 5A, 5B and 5C are schematic views for illustrating the method of obtaining the mass spectrum of the foreign matter or abnormal unsmoothness in the foreign matter or an abnormal unsmoothness inspection apparatus of the present invention.
Figure 5B:
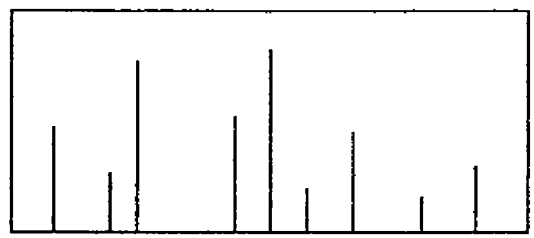
Figure 5C:
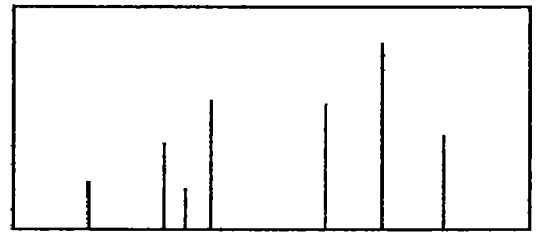

As a mass spectrum at a portion (S shown in FIG. 4) containing the foreign matter obtained from the detector of the TOF-SIMS, e.g., a mass spectrum for the foreign matter and the measuring object is obtained, as shown in FIG. 5A. As a mass spectrum for the measuring object, a mass spectrum shown in FIG. 5B is obtained. As a mass spectrum for the foreign matter (F shown in FIG. 4), a mass spectrum shown in FIG. 5C can be obtained by detecting the mass spectrum for the measuring object from the mass spectrum for the foreign matter and the measuring object. From the thus obtained mass spectrum, it is possible to perform identification and analysis of the foreign matter.

The foreign matter inspection apparatus may independently include the detecting means for detecting the foreign matter and the marking means, and may also be one including the mass spectrum measuring means into which the detecting means for detecting the foreign matter and the marking means are incorporated.

EMBODIMENT

The foreign matter inspection apparatus of the present invention will be specifically described below, with reference to the drawing, but the scope of the present invention is not limited thereto.

In this embodiment, a nanoindenter apparatus ("Triboindenter", manufactured by Hysitron, Inc.) having an atomic force microscope (AFM) function, and a TOF-SIMS ("TRIFT III", manufactured by ULVAC-PHI, Inc.) were used.

As an object to be measured, a sample was prepared by depositing a polystyrene fine particle having a diameter of 0.5 µm on a surface of an about 20-µm epoxy resin film formed on a silicon wafer. This sample was used, and the polystyrene fine particle was detected. On the epoxy resin film spaced at a position distant from the polystyrene fine particle by 5 µm, a dent was formed having a depth of about 2 µm. In the TOF-SIMS (TRIFT III), $Ga^+$ ions were used as primary ions, and the measuring object was impacted with the primary ions in an area (50 µm×50 µm), in which the polystyrene fine particle and the dent was capable of entering the same field of view. Mass spectra for generated secondary ions were collected. The mass spectrum for the polystyrene fine particle was extracted by the processing shown in FIGS. 5A to 5C, with the result that principally detected peaks (Mass 91 and Mass 115) were styrene-derived peaks and, thus, the polystyrene fine particle having a diameter of 0.5 µm was detected.

Accordingly, it is clear that identification and analysis of the foreign matter can be performed efficiently by the foreign matter inspection apparatus of the present invention.

COMPARATIVE EMBODIMENT

With respect to the sample used in the Embodiment discussed above, detection was performed by irradiating the sample with a laser beam having a wavelength of 488.0 nm, by using a laser Raman analyzer ("NR-1800", manufactured by JASCO Corp.) as a detecting means. By the laser beam irradiation, breakage of the polystyrene fine particle was caused to occur, so that the polystyrene fine particle was not detected. As a result, it was impossible to perform detection of position, identification and analysis of the polystyrene fine particle. Thus, it is clear that a fine particle of 1 µm or less cannot be detected by the detection using the laser beam.

While the invention has been described with reference to the structures disclosed herein, it is not confined to the details set forth, and this application is intended to cover such modifications or changes as may come within the purpose of the improvements or the scope of the following claims.

What is claimed is:
1. A foreign matter detecting apparatus comprising:
   a detecting member for detecting foreign matter by measuring smoothness of a surface of an object undergoing measurement, said detecting member being selected from the group consisting of a scanning electron microscope, a reflection electron microscope, an ion microscope, an electrical force microscope, and a magnetic force microscope;
   a marking device for providing a dent on the surface of the object, with a predetermined distance from the foreign matter, being detected by said detecting member; and
   a mass spectrum measuring device for irradiating and scanning, with a primary ion beam, a small area, as a part of the object, including the foreign matter and the dent, so as to measure a mass spectrum of secondary ions emitted from the foreign matter, located at a position within the predetermined distance from the dent.

2. An apparatus according to claim 1, wherein said detecting member measures the smoothness of the surface of the object through an atomic force.

3. An apparatus according to claim 1, wherein said marking device comprises a nanoindenter.

4. An apparatus according to claim 1, wherein the primary ion beam is an ion beam of a material selected from the group consisting of gold, bismuth, gallium, indium, and germanium.

5. An apparatus according to claim 1, wherein said mass spectrum measuring device comprises a data processing mechanism for analyzing the mass spectrum.

6. An apparatus according to claim 1, wherein said mass spectrum measuring device comprises a time-of-flight secondary ion mass spectrometer.

7. A foreign matter inspection method comprising:
   a detecting step of detecting foreign matter by measuring smoothness of a surface of an object undergoing measurement, using any one of a scanning electron microscope, a reflection electron microscope, an ion microscope, an electrical force microscope, and a magnetic force microscope;
   a marking step of providing a dent on the surface of the object, with a predetermined distance from the foreign matter, being detected in said detecting step; and
   a mass spectrum measuring step of irradiating and scanning, with a primary ion beam, a small area, as part of the object, including the foreign and the dent, so as to measure a mass spectrum of secondary ions emitted from the foreign matter, located at a position within the predetermined distance from the dent.

8. A foreign matter detecting apparatus comprising:
   a foreign matter detector for detecting foreign matter by measuring smoothness of a surface of an object undergoing measurement;
   a positional information detector for obtaining positional information of the foreign matter;
   a marking device for providing a dent on the surface of the object, with a predetermined distance from the foreign matter, being detected by said foreign matter detector; and
   a mass spectrum measuring device for irradiating and scanning, with a primary ion beam, a small area, as a part of the object, including the foreign matter and the dent, so as to measure a mass spectrum of secondary ions emitted from the foreign matter.

9. An apparatus according to claim 8, wherein said foreign matter detector measures the smoothness of the surface of the object through an atomic force.

10. An apparatus according to claim 8, wherein said marking device comprises a nanoindenter.

11. An apparatus according to claim 8, wherein the primary ion beam is an ion beam of a material selected from the group consisting of gold, bismuth, gallium, indium, and germanium.

12. An apparatus according to claim 8, wherein said mass spectrum measuring device comprises a data processing mechanism for analyzing the mass spectrum.

13. An apparatus according to claim 8, wherein said mass spectrum measuring device comprises a time-of-flight secondary ion mass spectrometer.

14. An apparatus according to claim 8, wherein said foreign matter detector is selected from the group consisting of a scanning electron microscope, a reflection electron microscope, an ion microscope, an electrical force microscope, and a magnetic force microscope.

15. A foreign matter inspection method comprising:
 a foreign matter detecting step of detecting foreign matter by measuring a smoothness of a surface of an object undergoing measurement;
 a positional information detecting step of obtaining positional information of the foreign matter;
 a marking step of providing a dent on the surface of the object, with a predetermined distance from the foreign matter, being detected in said foreign matter detecting step; and
 a mass spectrum measuring step of irradiating and scanning, with a primary ion beam, a small area, as a part of the object, including the foreign and the dent, so as to measure a mass spectrum of secondary ions emitted from the foreign matter.

16. A method according to claim 15, wherein said foreign matter detecting step detects the foreign matter using any one of a scanning electron microscope, a reflection electron microscope, an ion microscope, an electrical force microscope, and a magnetic force microscope.

* * * * *